United States Patent
Hwang et al.

(10) Patent No.: US 12,500,003 B2
(45) Date of Patent: Dec. 16, 2025

(54) METHOD OF PREDICTING PROGNOSIS OF PATIENT WITH ADENOCARCINOMA USING IMAGE FEATURE

(71) Applicants: D&P BIOTECH LTD., Seoul (KR); INDUSTRY-ACADEMIC COOPERATION FOUNDATION, YONSEI UNIVERSITY, Seoul (KR)

(72) Inventors: Do Sik Hwang, Seoul (KR); Doo Hyun Park, Seoul (KR); Myung Hoon Lee, Seoul (KR); Sun Gon Jun, Busan (KR); Dae Joong Oh, Gyeonggi-do (KR)

(73) Assignees: D&P Biotech Ltd., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 350 days.

(21) Appl. No.: 18/246,437

(22) PCT Filed: Sep. 23, 2021

(86) PCT No.: PCT/KR2021/012960
§ 371 (c)(1),
(2) Date: Mar. 23, 2023

(87) PCT Pub. No.: WO2022/065877
PCT Pub. Date: Mar. 31, 2022

(65) Prior Publication Data
US 2023/0395268 A1    Dec. 7, 2023

(30) Foreign Application Priority Data

Sep. 24, 2020 (KR) .......................... 10-2020-0124099
Aug. 18, 2021 (KR) .......................... 10-2021-0108738

(51) Int. Cl.
*G16H 50/50* (2018.01)
*G06T 7/00* (2017.01)
*G06T 7/11* (2017.01)

(52) U.S. Cl.
CPC ........... *G16H 50/50* (2018.01); *G06T 7/0012* (2013.01); *G06T 7/11* (2017.01);
(Continued)

(58) Field of Classification Search
None
See application file for complete search history.

(56) References Cited

U.S. PATENT DOCUMENTS

| 2009/0234627 A1 | 9/2009 | Yu et al. |
| 2012/0189176 A1 | 7/2012 | Giger et al. |

(Continued)

FOREIGN PATENT DOCUMENTS

| KR | 10-2020-0099633 A | 8/2020 |
| WO | 2019/025270 A1 | 2/2019 |

OTHER PUBLICATIONS

Korean Intellectual Property Office, Notice of Allowance, Application No. 10-2021-0108738, dated Sep. 19, 2024, 3 pages.
(Continued)

*Primary Examiner* — Mark R Milia
(74) *Attorney, Agent, or Firm* — Sunstein LLP

(57) ABSTRACT

Disclosed is a method of predicting a prognosis of a patient with adenocarcinoma using image features. The method of predicting a prognosis according to an embodiment of the present invention includes receiving an image including a lesion region of a patient, preprocessing the received image, segmenting the lesion region in the preprocessed image and calculating at least one of biomarkers indicating an intensity value and a texture information value within the segmented lesion region, and outputting a prognosis prediction value of
(Continued)

the patient on the basis of the calculated at least one biomarker.

10 Claims, 8 Drawing Sheets

(52) U.S. Cl.
CPC ............... *G06T 2207/10081* (2013.01); *G06T 2207/20081* (2013.01); *G06T 2207/30064* (2013.01); *G06T 2207/30096* (2013.01)

(56) References Cited

U.S. PATENT DOCUMENTS

2014/0314292 A1 10/2014 Kamen et al.
2018/0189594 A1 7/2018 Ganeshan et al.

OTHER PUBLICATIONS

European Patent Office, Extended European Search Report, Application No. 21872905.1, dated Oct. 10, 2024, 13 pages.
Avanzo, M. et al., "The promise of radiomics," Physica Medica, vol. 38, Jun. 7, 2017, pp. 122-139, XP085065322, ISSN: 1120-1797, DOI: 10.1016/J.EJMP.2017.05.071.
Avanzo, M. et al., "Machine and deep learning methods for radiomics," Medical Physics, vol. 47, No. 5, May 1, 2020, XP055719727, ISSN: 0094-2405, DOI: 10.1002/mp.13678, 18 pages.
Farchione, A. et al., "Exploring technical issues in personalized medicine: NSCLC survival prediction by quantitative image analysis-usefulness of density correction of volumetric CT data," La Radiologica Medica, vol. 125, No. 7, Mar. 3, 2020, pp. 625-635, XP037168049, ISSN: 0033-8362, DOI: 10.1007/S11547-020-01157-3.
Khorrami, M. et al., "Stable and discriminating radiomic predictor of recurrence in early stage non-small cell lung cancer: Multi-site study," Lung Cancer, vol. 142, Feb. 26, 2020, pp. 90-97, XP086090190, ISSN: 0169-5002, DOI: 10.1016/J.LUNGCAN.2020.02.018.
Korean Intellectual Property Office, Office Action, Application No. 10-2021-0108738, dated Jan. 16, 2024, 19 pages.

[Fig. 1]
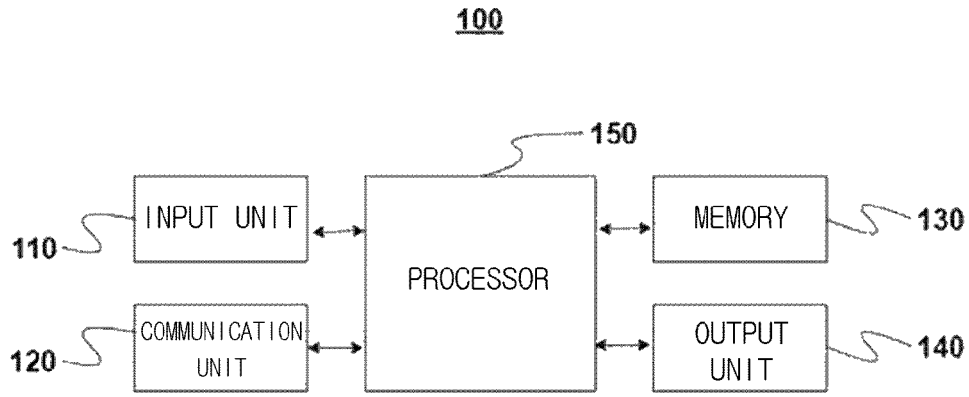
[Fig. 2]
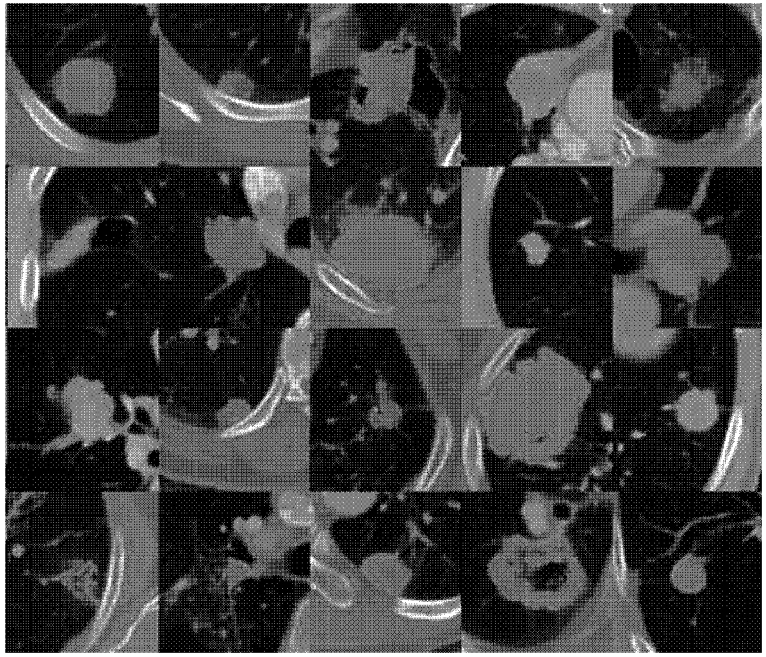
[Fig. 3]
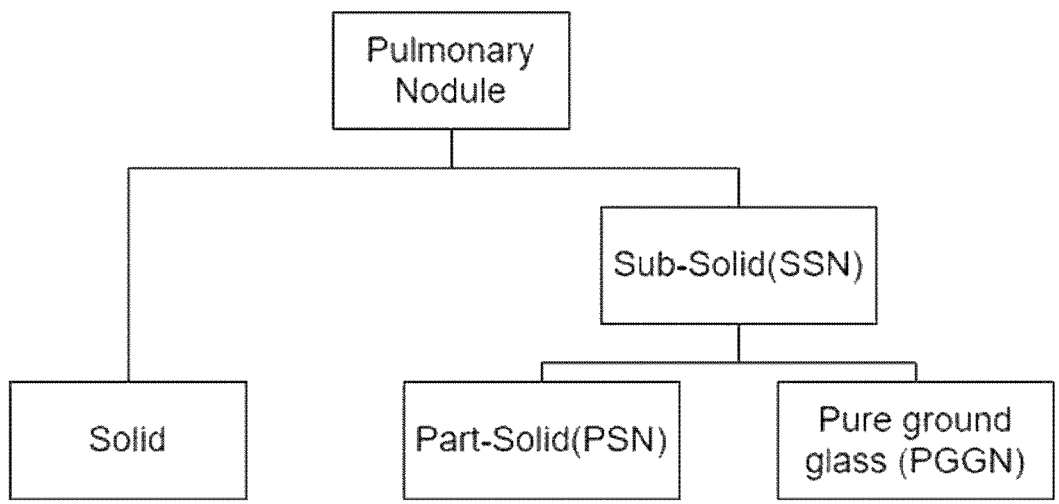

[Fig. 4]
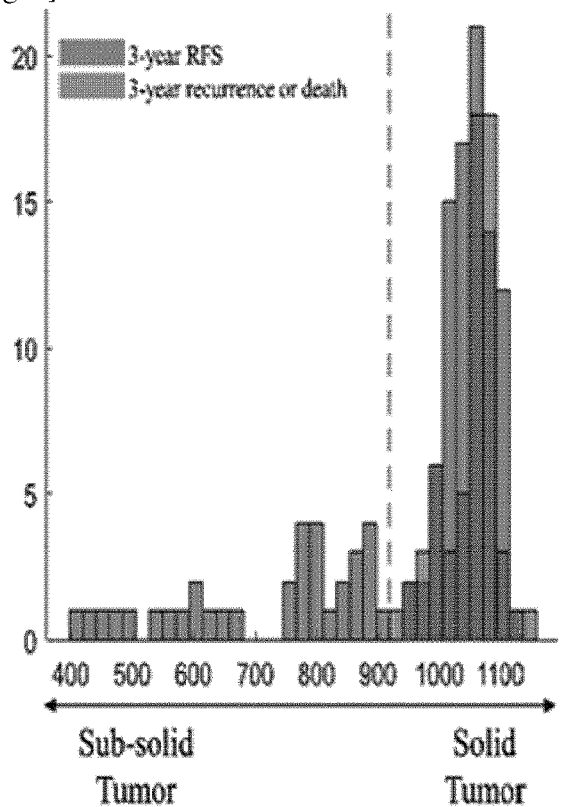
[Fig. 5]
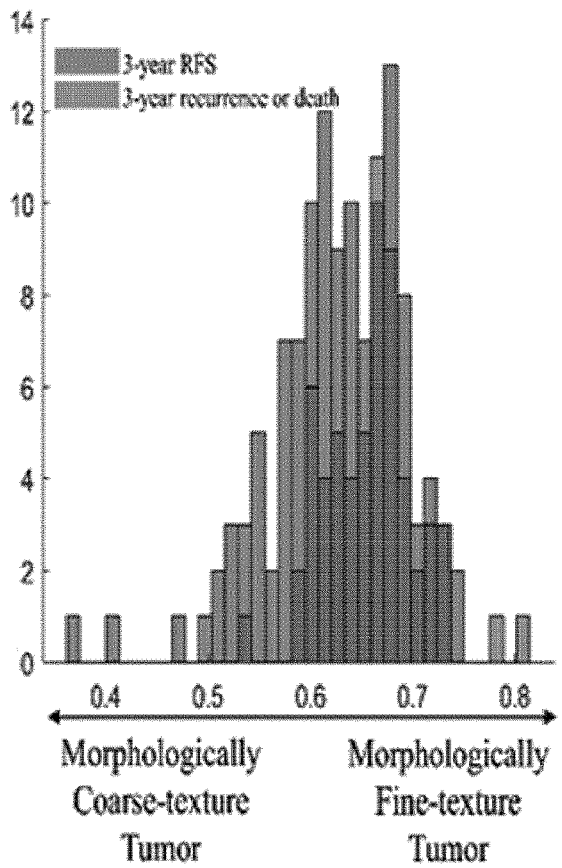

[Fig. 6]
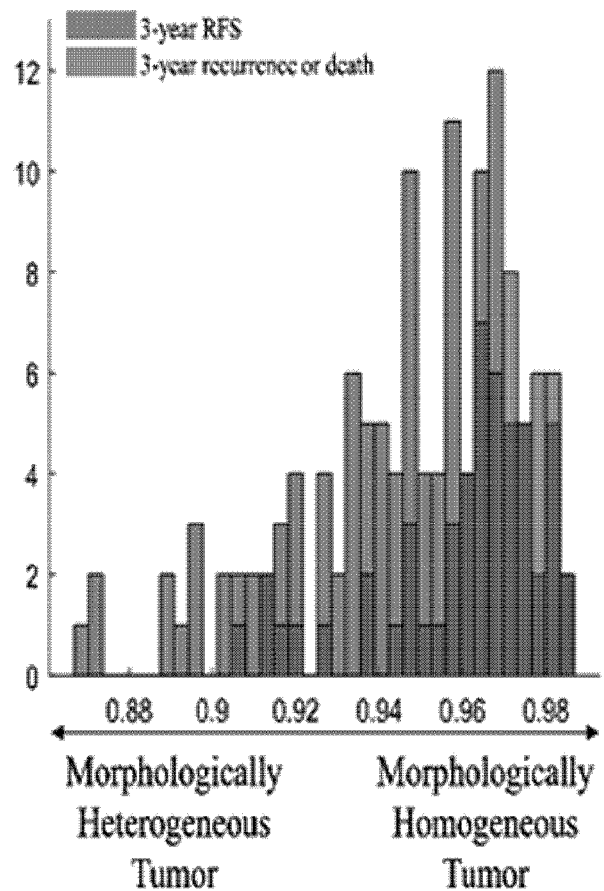

[Fig. 7]
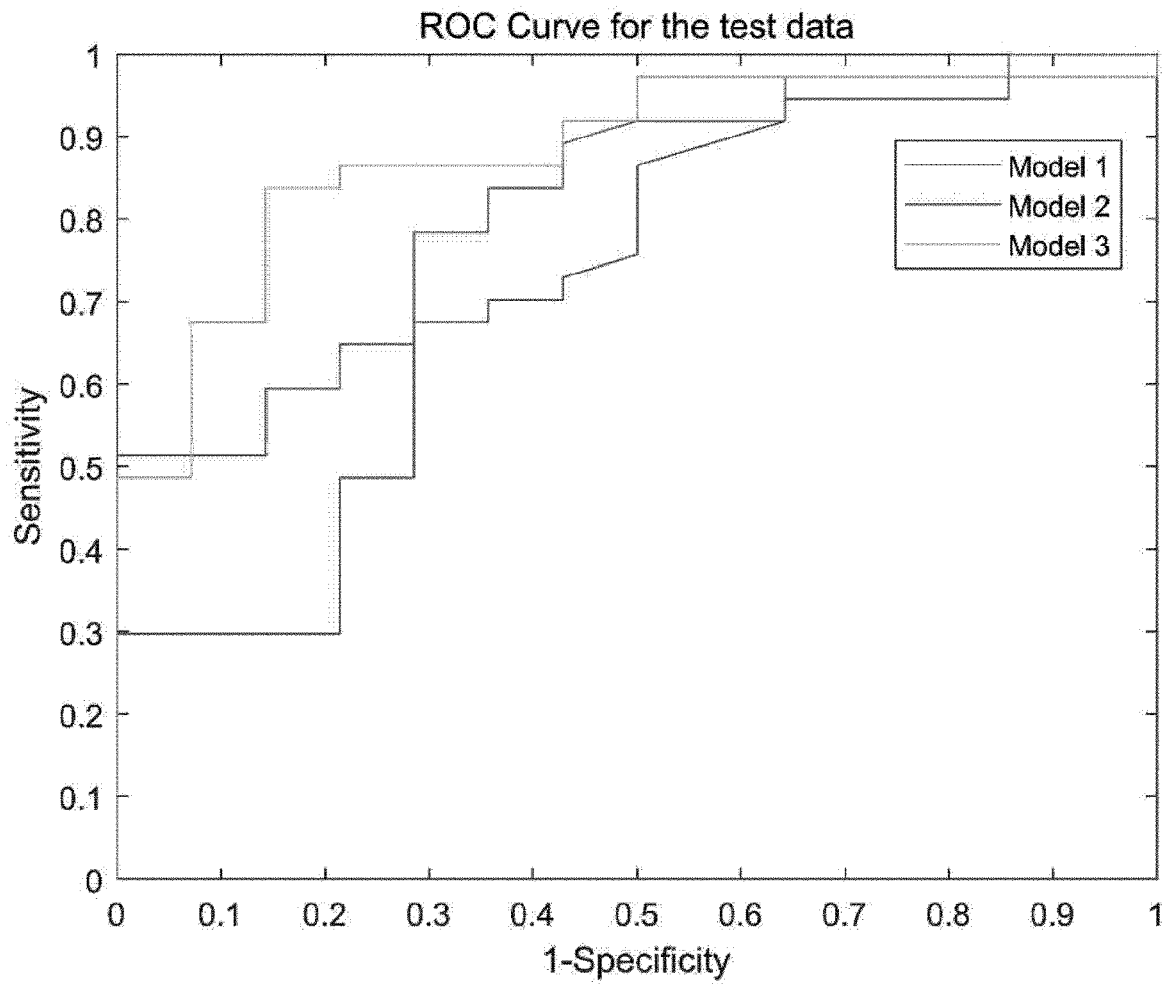
[Fig. 8]
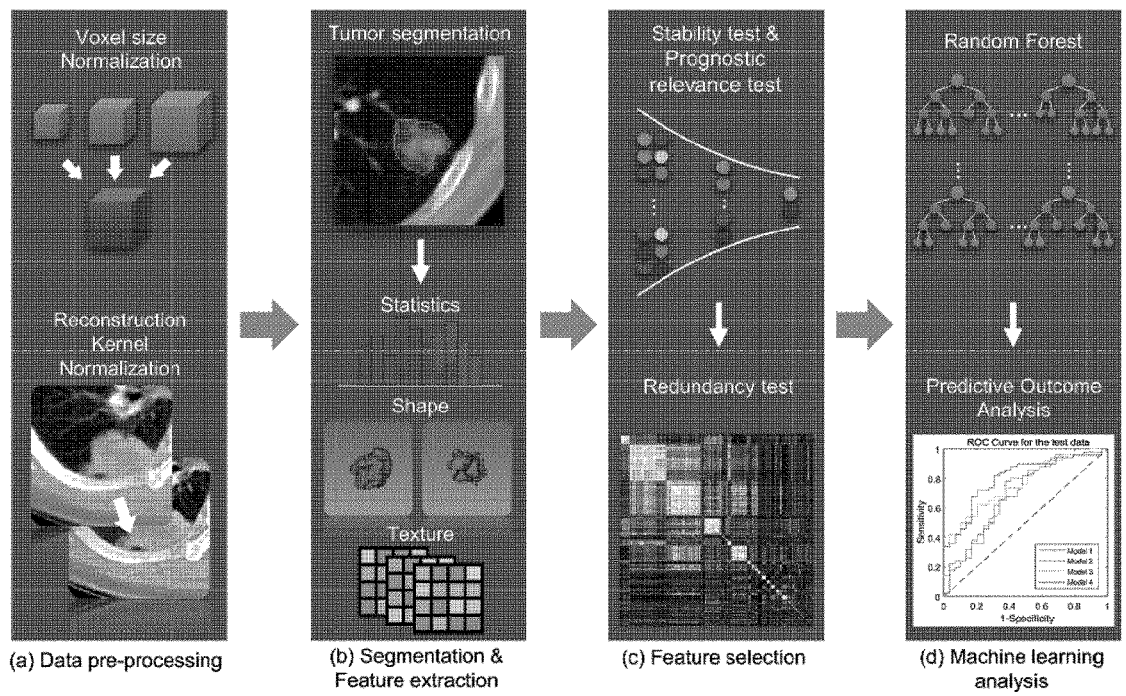

[Fig. 9]
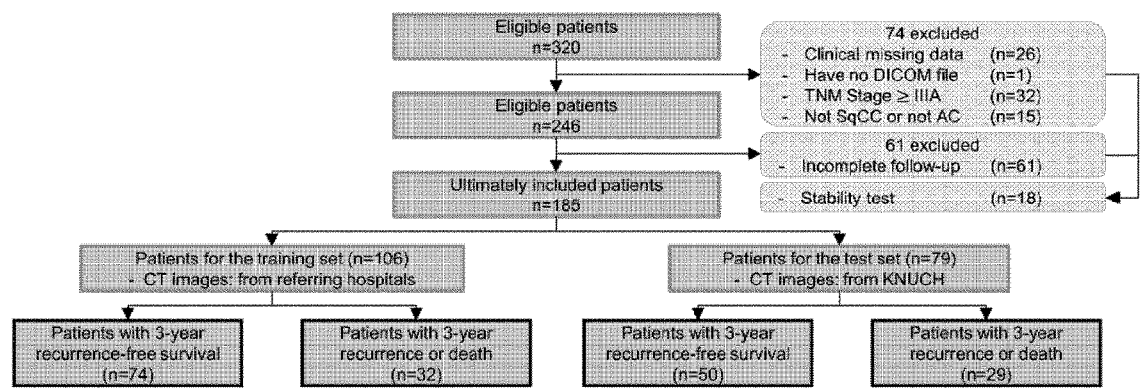
[Fig. 10]
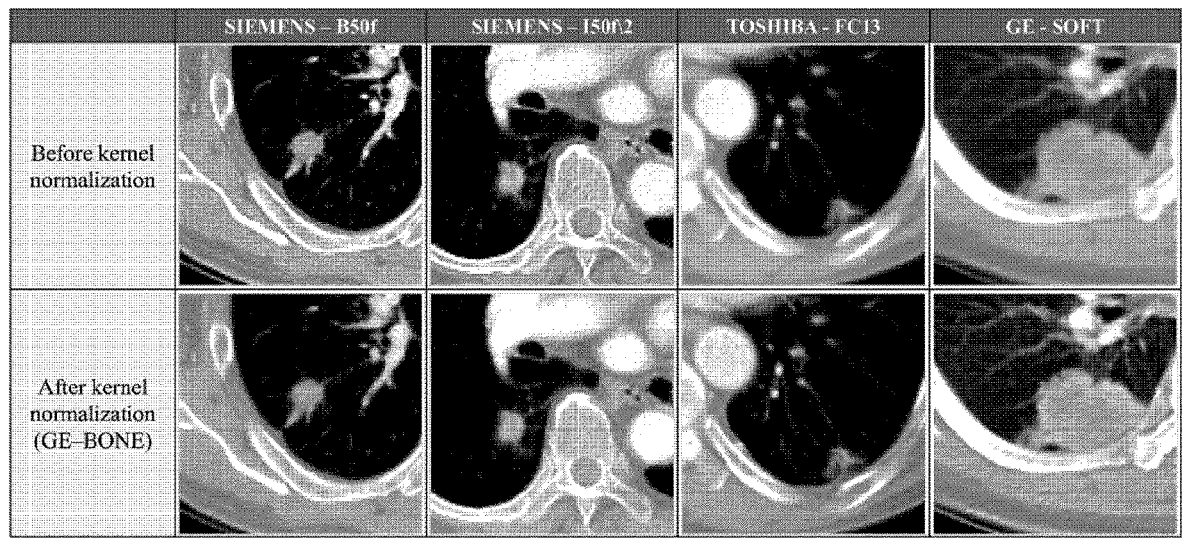

[Fig. 11]

Procedure KernelNormalize$(L, S, r)$

Inputs:
  $L$ : CT image $(= L_0)$
  $S$ : lung segmentation
  $r$ : coefficients for reference kernel
  $\sigma$ : scale of gaussian filter

Outputs:
  $O$ : normalized CT image
  $\lambda$ : scale factor for each frequency band $i$
  $e$ : energy for each frequency band imag $n = \text{length}(\sigma)$
for $k = 1$ to $n$ do
  $L_k = gaussian(L, \sigma)$
  $F_k = L_{k-1} - L_k$
  $F'_k = vectorize(F_k * S)$
delete $F'_k == 0$
$e_k = standard\ deviation\ (F'_k)$
$\lambda_k = r_k / e_k$
$O = \lambda_1 * F_1 + \lambda_2 * F_2 + \cdots + \lambda_n * F_n + L_n$

While $\exists\ \lambda < 0.95\ or\ \lambda \geq 1.05$
  $O = L$
  KernelNormalize$(L, S, r)$

[Fig. 12]

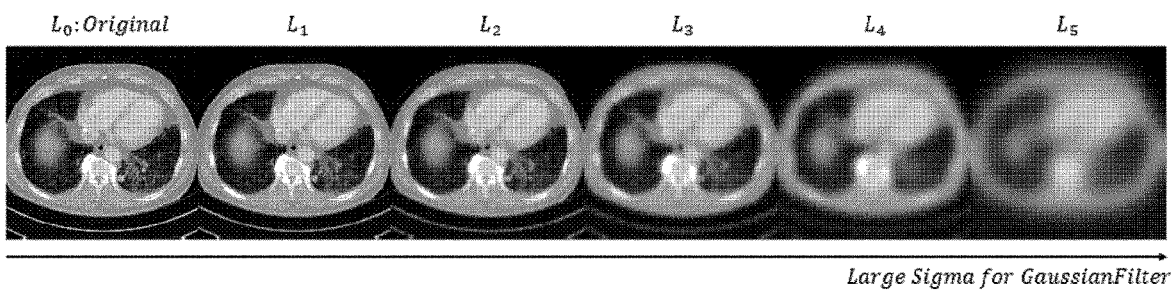

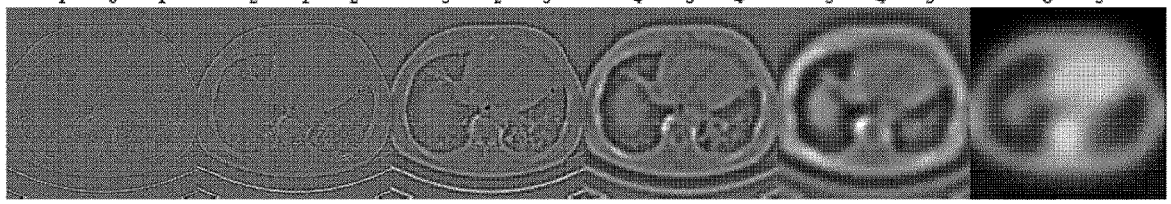

$\lambda_i = \dfrac{Reference\ vector(i)}{std(Lung(F_i))}$  $I_{normalized} = \lambda_1 F_1 + \lambda_2 F_2 + \lambda_3 F_3 + \lambda_4 F_4 + \lambda_5 F_5 + F_6$
Iteratively,  for $\forall\ 0.95 \leq \lambda_i \leq 1.05$

[Fig. 13]

| Tests | CT Image Source of Radiomic Features | | |
|---|---|---|---|
| | Non Normalized | Voxel Normalized | Voxel and Kernel Normalized |
| Stability test (851) | 78 | 78 | 78 |
| Wilcoxon rank-sum test (78) | 4 | 2 | 4 |
| Correlation test | 1 | 2 | 3 |

Note.— The numbers in parentheses indicate the total number of features for each test. The numbers indicate the number of features selected. Stability test 1) Reproducibility test: Performed with our excluded data (SMAPE<2.5%). Stability test 2) Repeatability test: Performed with RIDER data (SMAPE<2.5%). Wilcoxon rank-sum test: $P < 0.1$ for patients with stage I in discovery set. Correlation test: Features with correlation > 0.7 were considered as redundant features, so excluded. SMAPE: Symmetric mean absolute percentage error.

[Fig. 14]

| Cohort and Radiomic Feature | CT Image Source of Radiomic Features | | |
|---|---|---|---|
| | Non-Normalized | Voxel Normalized | Voxel and Kernel Normalized |
| Discovery (TNM stage I, n = 77)* | | | |
| waveletHLL_glcm_IDN ($f_{IDN}$) | .040 | .104 | .073 |
| 90Percentile ($f_{90P}$) | .127 | .075 | .091 |
| glszm_SAE ($f_{SAE}$) | .131 | .051 | .047 |
| Overall (n = 185) | | | |
| waveletHLL_glcm_IDN ($f_{IDN}$) (x$10^{-3}$) | .116 | .008 | .003 |
| 90Percentile ($f_{90P}$) | .003 | .002 | <.001 |
| glszm_SAE ($f_{SAE}$) | .012 | .002 | .001 |

Note.— glcm_IDN = GrayLevelCooccurenceMatrix_InverseDifferenceNormalized. glszm_SAE = GrayLevelSizeZoneMatrix_SmallAreaEmphasis.
* Wilcoxon rank-sum test was performed using only TNM stage I patients (n = 77) to select the features which are less dependent on the TNM stage.

[Fig. 15]

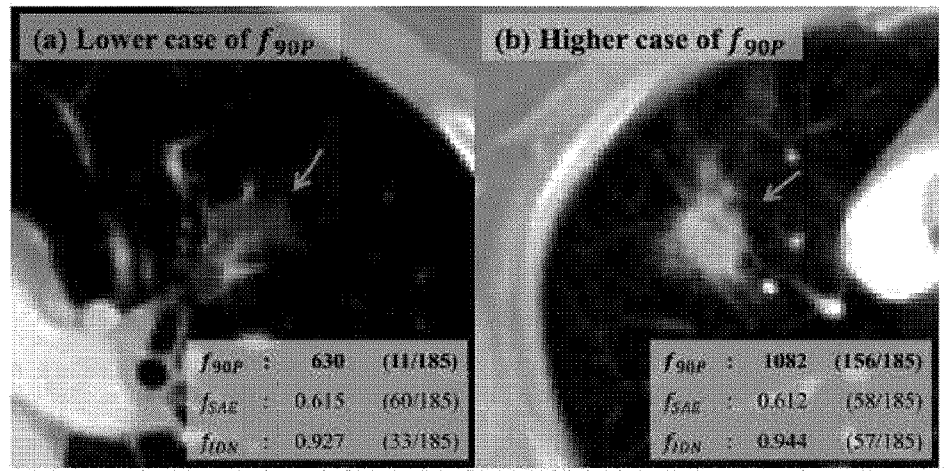

[Fig. 16]
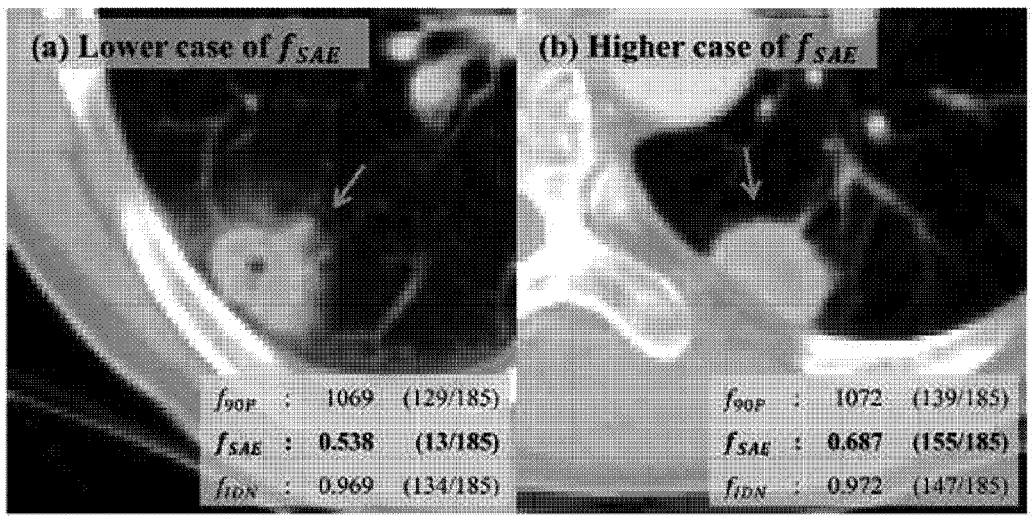
[Fig. 17]
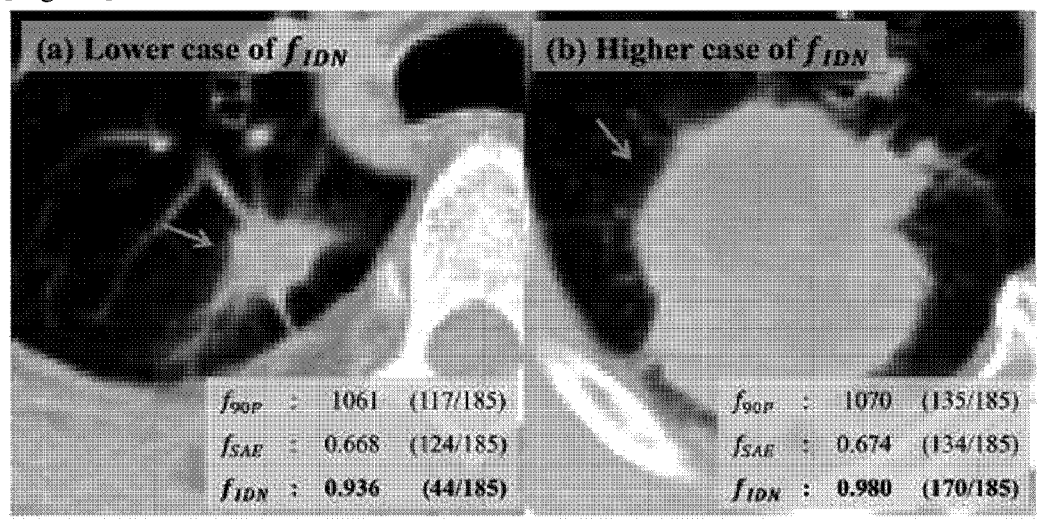

METHOD OF PREDICTING PROGNOSIS OF PATIENT WITH ADENOCARCINOMA USING IMAGE FEATURE

This application is the national phase entry of international patent application no. PCT/KR2021/012960, filed Sep. 23, 2021 and claims the benefit of Korean patent application No. 10-2020-0124099, filed Sep. 24, 2020 and Korean patent application No. 10-2021-0108738, filed Aug. 18, 2021, the disclosures of which are incorporated herein by reference in their entirety.

TECHNICAL FIELD

The present invention relates to a method of predicting a prognosis of a patient with adenocarcinoma using image features, and more particularly, to a prognosis prediction method, in which accuracy of a model for predicting recurrence or death in a patient with adenocarcinoma using biomarkers obtained from a computed tomography (CT) image is improved, and a prognosis prediction model using the same.

BACKGROUND ART

Generally, clinicians predict prognoses of patients with adenocarcinoma on the basis of clinical information (e.g., lung cancer pathologic stage, gender, age, smoking or not, smoking amount, etc.) of the patients with adenocarcinoma and determine whether to proceed with adjuvant therapy or postoperative follow-up after cancer removal surgery according to a result of the prediction. In this way, accurate prognosis prediction is directly related to a correct treatment method for the patient.

In the past, there have been attempts to use image information such as computed tomography (CT) images to predict prognoses of patients with adenocarcinoma. However, these attempts mainly depended on image reading based on clinicians' experience and it was difficult to find biomarkers specialized for prognosis prediction.

DISCLOSURE OF INVENTION

Technical Problem

In order to solve the above problems, the present invention is directed to providing a prognosis prediction method in which, by finding and verifying image features specialized for prognosis prediction in addition to clinical information, accuracy of a model for predicting recurrence in a patient with adenocarcinoma is improved.

Solution to Problem

According to an aspect of the present invention, there is provided a method of predicting a prognosis of a patient with adenocarcinoma using clinical information and image features, which includes receiving an image including a lesion region of a patient, preprocessing the received image, segmenting the lesion region in the preprocessed image and calculating at least one of biomarkers indicating an intensity value and a texture information value within the segmented lesion region, and outputting a prognosis prediction value of the patient on the basis of the calculated at least one biomarker.

The calculating of the at least one of the biomarkers may include measuring intensities of all voxels within the segmented lesion region and calculating a value of a component corresponding to the top 10% when sorting values of the measured intensities of all the voxels in descending order as a first biomarker.

The first biomarker may be a radiomic feature by which a type of lung nodule is determined.

The first biomarker may be a radiomic feature quantitatively indicating a consolidation/tumor ratio.

The calculating of the at least one of the biomarkers may include converting the segmented lesion region into a preset matrix, calculating a second biomarker having a value corresponding to the texture of the lesion region using the converted matrix, and calculating a third biomarker having the value corresponding to the texture of the lesion region using the converted matrix.

The calculating of the second biomarker may include converting the segmented lesion region into a matrix in which a distribution of a small-size zone is measured.

The calculating of the third biomarker may include converting the segmented lesion region into a matrix in which local homogeneity is measured.

The biomarkers may have a symmetric mean absolute percentage error (SMAPE) value of less than 2.5% according to a difference in a method of segmenting the lesion region.

The preprocessing of the received image may include performing preprocessing for normalizing the image processed with an arbitrary reconstruction kernel.

The performing of the preprocessing for normalizing the image may include generating a plurality of filter-passed images by passing the received image through Gaussian filters having different scales, generating a plurality of frequency images having different frequency components using differences between the plurality of generated filter-passed images, and repeating the generating operations such that a standard deviation of the plurality of generated frequency images is less than or equal to a preset value.

The method may further include generating a prognosis prediction model on the basis of the calculated at least one biomarker, and the outputting of the prognosis prediction value of the patient may include outputting the prognostic predictive value derived by inputting the image including the lesion region of the patient to the generated prognosis prediction model.

Advantageous Effects of Invention

Types of lung nodule, which have been previously and subjectively determined, can be quantitatively classified through biomarkers according to image features, and thus accuracy in predicting a prognosis of a patient and determining a treatment method can be improved and the accuracy can be further improved by additionally utilizing biomarkers related to textures.

BRIEF DESCRIPTION OF DRAWINGS

FIG. 1 is a block diagram for describing a configuration of an electronic device capable of performing a prognosis prediction method according to an embodiment of the present invention.

FIG. 2 shows exemplary diagrams of a lesion in a computed tomography (CT) image, which is segmented.

FIG. 3 is a diagram for describing classification of nodule types.

FIGS. 4 to 6 are diagrams showing histograms for first to third biomarkers.

FIG. 7 is a receiver operating characteristic (ROC) curve showing improvement in performance of prognosis prediction when biomarkers are used according to various embodiments of the present invention.

FIG. 8 is a set of diagrams for describing an overall process of this study.

FIG. 9 is a diagram for describing patient data used in this study.

FIG. 10 is a set of diagrams showing CT images obtained by various CT machines before and after reconstruction kernel normalization.

FIGS. 11 and 12 are exemplary diagrams for describing a procedure of reconstruction kernel normalization.

FIG. 13 is a reference diagram showing stability test and a Wilcoxon rank-sum test process.

FIG. 14 is a diagram showing statistical verification values of results of this study, which are summarized, and FIGS. 15 to 17 are diagrams showing results of comparison of CT images in the cases in which values of first to third biomarkers are high and low.

MODE FOR THE INVENTION

Hereinafter, various embodiments of the present invention will be described with reference to the accompanying drawings. However, it should be understood that there is no intent to limit the technique described in this specification to the particular forms disclosed and the present invention is to cover various modifications, equivalents, and/or alternatives of the embodiments in this specification. With respect to the descriptions of the drawings, like reference numerals may be used for like elements.

In this specification, expressions such as "have," "may have," "includes," or "may include" refer to the presence of a corresponding feature (e.g., a numerical value, function, operation, or component such as a part) and does not exclude the presence of additional features.

In this specification, expressions such as "A or B," "at least one of A and/or B," or "one or more of A and/or B" may include all possible combinations of listed items. For example, "A or B," "at least one of A and/or B," or "one or more of A and/or B" may refer to all cases of (1) including at least A, (2) including at least B, and (3) including both A and B. Expression such as "first" or "second" as used herein may modify various elements, regardless of order and/or importance thereof and is only used to distinguish one element from another element and does not limit the elements.

The expression "configured to (or set to)" as used herein may be used interchangeably with, for example, "suitable for," "having the capacity to," "designed to," "adapted to," "made to," or "capable of," depending on the situation. The expression "configured to (or set to)" may not necessarily mean only "specifically designed to" in hardware. Instead of the above, in some situations, the expression "a device configured to" may mean that the device is "capable of" along with other devices or parts. For example, the phrase "a coprocessor configured (or set) to perform A, B, and C" may refer to a dedicated processor (e.g., an embedded processor) for performing a corresponding operation or a generic-purpose processor (e.g., a central processing unit (CPU) or an application processor) capable of performing corresponding operations by executing one or more software programs stored in a memory device.

In the following description, the term "prognosis" is a term including the onset, recurrence, metastatic spread, drug resistance of a neoplastic disease such as lung cancer, lung cancer-caused death, the possibility of progression to lung cancer-caused death, the course of disease, and whether or not there is a cure. In the following description, the term "lung cancer" is a term including squamous carcinoma, squamous cell carcinoma, adenocarcinoma, and small cell carcinoma.

Hereinafter, the present invention will be described in detail with reference to the accompanying drawings.

FIG. 1 is a block diagram for describing a configuration of an electronic device 100 capable of performing a prognosis prediction method according to an embodiment of the present invention. Referring to FIG. 1 the electronic device 100 may include an input unit 110, a communication unit 120, a memory 130, an output unit 140, and a processor 150. However, all of the above-described components are not essential when the prognosis prediction method according to the embodiment of the present invention is performed, and various components may be additionally included in addition to the above-described components.

The input unit 110 may receive clinical information and the like of a patient (a patient with adenocarcinoma, patient with squamous cell carcinoma, etc.). For example, the input unit 110 may be implemented as a keyboard, a touch screen, or the like to receive a sentence input by a user in the form of text.

The communication unit 120 may perform communication with an external server. The communication unit 120 may receive image information, clinical information, and the like of the patient from the external server. For example, the image information may be a computed tomography (CT) image of a patient with adenocarcinoma. The communication unit 120 may include various wired and wireless communication modules. For example, the communication unit 120 may be connected to an external network in a manner such as a wired local area network (LAN), Bluetooth, Zigbee, Wi-Fi, or Wi-Fi direct to perform communication with the external network. In addition, the communication unit 120 may further include a mobile communication module for performing communication by accessing a mobile communication network according to various mobile communication standards such as 3rd Generation (3G), 3rd Generation Partnership Project (3GPP), Long-Term Evolution (LTE), LTE Advanced (LTE-A), 5th Generation (5G), etc. The memory 130 may serve to store various modules, software, and data for driving the electronic device 100. For example, the image information and the clinical information of the patient, a prognosis prediction model for which training is completed, and the like may be stored in the memory 130. The memory 130 is a storage medium in which various types of programs necessary for operating the electronic device 100 are stored, and may be implemented in the form of a flash memory, a hard disk drive (HDD), a solid-state drive (SSD), or the like. For example, the memory 130 may include a read only memory (ROM) for storing a program for performing an operation of the electronic device 100 and a random-access memory (RAM) for temporarily storing data according to the operation of the electronic device 100.

The output unit 140 may output a prognostic result predicted using a generated prognosis prediction model. The output unit 140 may be implemented in various forms such as a display, a printer, a speaker, and the like. For example, the output unit 140 may be implemented as a liquid crystal display (LCD), an organic light-emitting display (OLED), a plasma display panel (PDP), or the like and may display various screens provided through the electronic device 100.

The processor 150 may control the above-described components of the electronic device 100. For example, the processor 150 may control the communication unit 120 to receive image information of a plurality of patients, which will be used for training or testing. The processor 150 may be manufactured in the form of one hardware chip or a plurality of hardware chips and mounted on the electronic device 100. For example, the processor 150 may be manufactured in the form of a dedicated hardware chip for artificial intelligence or may be manufactured as a conventional general-purpose processor (e.g., a CPU or an application processor).

The processor 150 may preprocess a received CT image of the patient. For example, the processor 150 may perform at least one preprocessing among voxel size normalization and reconstruction kernel normalization. The voxel size normalization is preprocessing in which actual sizes of individual voxels in the CT image are adjusted uniformly (e.g., 1×1×1 mm3). Further, the reconstruction kernel normalization is preprocessing in which differences in texture between several CT images generated using different reconstruction kernels, which are caused by differences in CT imaging devices or methods, are compensated for. Detailed descriptions thereof will be given below.

The processor 150 may segment a lesion region in the preprocessed image. FIG. 2 shows exemplary diagrams of a lesion in a CT image, which is segmented. In the embodiment of FIG. 2, the electronic device 100 visualizes boundaries of segmented lesion regions in red. There is a problem in that the segmented lesion region varies depending on the software used or a skill level of a radiologist. However, biomarkers according to the embodiment of the present invention, which will be described below, correspond to radiomic features with little influence according to a lesion region segmentation method, and thus may function as stable prognosis prediction biomarkers.

The processor 150 may measure intensities of all voxels in the segmented lesion region. In addition, the processor 150 may sort values of the measured intensities of all the voxels in descending order and calculate a value of a component corresponding to the top 10% as a first biomarker f1. For example, since a unit of intensity of a pixel in the CT image is a Hounsfield unit (HU), the first biomarker f1 may be a biomarker representing a HU value of the top 10% only in the CT image.

The processor 150 may determine a nodule type of lung cancer according to whether the measured value of the first biomarker f1 is included in a preset range. Referring to FIG. 3, the nodule type may be roughly divided into a solid type and a sub-solid type. Clinically, solid tumors have a poorer prognosis than sub-solid tumors and a cancer growth rate is relatively fast, and thus more frequent follow-ups are required. Conversely, it is known that the sub-solid tumors have a slow growth rate and have a relatively low recurrence rate after surgery. Therefore, determining whether a type of patient's tumor is a solid type or a sub-solid type from the CT image is very helpful in predicting the prognosis. In the present invention, the first biomarker f1 is found for such a determination and an effect thereof is verified. FIG. 4 is a diagram showing a histogram for the first biomarker f1. As can be seen in FIG. 4, the first biomarker f1 is useful for distinguishing between a solid type and a sub-solid type, and shows very high accuracy in predicting a prognosis, especially when the type of tumor is classified based on a value corresponding to a central dotted line.

As described above, the first biomarker f1 may be a radiomic feature by which the type of lung nodule is determined. Further, the first biomarker f1 may be a radiomic feature quantitatively indicating a consolidation/tumor ratio (C/T ratio).

Referring to details of the study to be described below, it was found that none of 34 patients (18.4% of all patients), with a value of the first biomarker f1 less than a specific value, among 185 patients who participated in the study did not have a 3-year recurrence. Further, it was confirmed that all of the 34 patients had sub-solid tumors. In this way, the first biomarker f1 corresponds to a very excellent biomarker for classifying types of lung cancer into a solid type and a sub-solid type.

The electronic device 100 according to the embodiment of the present invention may objectively and quantitatively classify nodule types, which have been subjectively determined by clinicians by viewing images, by utilizing the first biomarkers f1. Conventionally, there was a problem in that even radiologists with 17 to 25 years of experience classify nodule types into a solid type and a sub-solid type inconsistently by viewing a CT image. The electronic device 100 may solve the above problem by introducing the first biomarker f1 and precisely determine a treatment method by quantitatively and automatically classifying the nodule types.

Another advantage of the first biomarker f1 is that the first biomarker f1 is robust against an error in which the segmented region varies. Generally, radiomic features have a problem in that values thereof vary depending on a segmentation result. However, the first biomarker f1 has characteristics that are less sensitive to image quality or segmentation results, and thus corresponds to a highly reproducible biomarker.

The processor 150 may predict a prognosis of the patient with adenocarcinoma on the basis of a second biomarker f2 and a third biomarker f3 which correspond to textures of the lesion regions. The processor 150 may convert the segmented lesion regions into a preset matrix and calculate values corresponding to the textures of the lesion regions using the converted matrix.

The processor 150 may convert the segmented lesion regions into a matrix in which a distribution of a small-size zone may be measured. Using the converted matrix, the processor 150 may calculate the second biomarker f2. For example, the processor 150 may convert the segmented lesion regions into a Gray Level Size Zone Matrix (GLSZM). The GLSZM is a matrix obtained by quantifying a gray level zone in an image. The gray level zone refers to the number of connected voxels sharing the same gray level intensity. The processor 150 may calculate the second biomarker f2 having a value corresponding to the texture of the lesion region using the converted GLSZM. The second biomarker f2 exhibits a coarse texture as the value thereof decreases. FIG. 5 is a diagram showing a histogram for the second biomarker f2.

The processor 150 may convert the segmented lesion regions into a matrix in which local homogeneity of the image may be measured. Using the converted matrix, the processor 150 may calculate the third biomarker f3. For example, the processor 150 may convert the segmented lesion regions into a Gray Level Co-occurrence Matrix (GLCM). The GLCM refers to a quadratic joint probability function of a region of the image limited by a mask. The processor 150 may calculate the third biomarker f3 having a value corresponding to the texture of the lesion region using the converted GLCM. The third biomarker f3 also exhibits a coarse texture as the value thereof decreases. FIG. 6 is a diagram showing a histogram for the third biomarker f3.

However, a correlation between the second biomarker f2 and the third biomarker f3 is only 0.1926, and thus relevance therebetween is low. The second biomarker f2 has no correlation with a shape feature and the third biomarker f3 has a high correlation with a surface volume ratio (SVR) feature. A correlation between the third biomarker f3 and log(SVR) is −0.7044. That is, it can be seen that the third biomarker f3 is a feature related to a shape of the tumor unlike the second biomarker f2. The SVR is a value obtained by dividing a surface area of a divided three-dimensional (3D) tumor by a volume, and it means that the tumor is closer to a spherical shape as a value of the SVR decreases. According to this study, it was confirmed that, as the value of the SVR of the tumor of the patient with adenocarcinoma decreases such that the tumor is closer to a spherical shape, the probability of recurrence decreases. Further, it was confirmed that the third biomarker f3 is meaningfully related to the prognosis of the patient even for the patient with solid-type tumor.

The processor 150 may output a prognosis prediction value of the patient on the basis of at least one of the calculated biomarkers. According to an embodiment of the present invention, the electronic device 100 may use the first to third biomarkers f1, f2, and f3 so that the accuracy of the prognosis prediction model of the patient with adenocarcinoma may be increased. That is, the prognosis prediction model may be trained using the first to third biomarkers f1, f2, and f3 obtained through the above-described method. The prognosis prediction model may be one of various types of models such as a machine learning model, a deep learning model, a random forest model, and the like. As an example, by inputting an image including a lesion region of a patient to the prognosis prediction model generated after the training is completed, the prognosis prediction model may output a prognosis prediction value of the patient. As another example, the image is not directly input to the prognosis prediction model generated after the training is completed, but the values of the first to third biomarkers f1, f2, and f3 derived in advance may be input to the prognosis prediction model.

In this study, in order to confirm such an effect, a degree of improvement in performance was confirmed using a random forest model. Data for training the random forest model and test data are shown in Table 1 below.

TABLE 1

| Number of patients with adenocarcinoma (persons) | Training Data | Test Data |
| --- | --- | --- |
| No recurrence | 56 | 37 |
| Recurrence | 24 | 14 |
| Total | 80 | 51 |

For the first biomarker, clinical relevance was also confirmed, and as shown in model #1→model #2 shown in Table 2 below, an increase in area under a receiver operator characteristic curve (AUC) was meaningfully confirmed. A high AUC value means that a prognosis of a patient with adenocarcinoma was more accurately predicted. Further, as shown in model #2→model #3, it can be confirmed that when the second and third biomarkers were used in addition to the first biomarker, an increase in AUC was additionally observed.

TABLE 2

| Test AUC | Model #1 clinical information (TNM stage, age, and gender) | Model #2 clinical information + f1 | Model #3 clinical information + f1 + f2 + f3 |
| --- | --- | --- | --- |
| Patients with adenocarcinoma | 0.7230 | 0.8253 | 0.8803 |

A receiver operator characteristic (ROC) curve that visualizes the above results is shown in FIG. 7.

As described above, in the present invention, three types of biomarkers specialized for prognosis prediction of patients with adenocarcinoma were found and verified. Using these biomarkers, it can be confirmed that the accuracy of the model for predicting the prognosis, such as the presence or absence of 3-year recurrence after surgery for the patients with adenocarcinoma or the like, is improved.

Hereinafter, the above will be described in more detail. An overall process of the content to be described below is shown in FIG. 8. Referring to FIG. 8, a preprocessing process of CT images, a region segmentation process and radiomic feature derivation, biomarker selection through a stability test and a relevance test for obtained radiomic features, validation through a random forest model, and a prognosis prediction model analysis process are performed.

Globally, lung cancer is a leading cause of cancer-related death. Since lung cancer may have different risks of recurrence and death even in patients who are in the same pathologic stage, there is a need to predict a prognosis and appropriately select candidates who are suitable for postoperative adjuvant therapy. Although a pathologic stage is the most important prognostic factor, it has been shown that tumor morphology could also be related to the prognosis of patients. In this study, a method of predicting a prognosis using quantitative radiomic features that may be obtained from CT images is proposed.

In this study, data was collected and used from 320 lung cancer patients who underwent surgical resection between March 2011 and September 2016. Among the 320 patients, 26 patients who had clinical missing data and one patient who did not have images in the digital imaging and communications in medicine (DICOM) format were removed. In addition, based on whether early-stage non-small cell lung cancer was stage 2 or lower (Tumor-Node-Metastasis stage was lower than or equal to stage 2) or whether the cancer corresponds to adenocarcinoma or squamous cell carcinoma, 47 patients who did not fall into the above category were additionally removed. Lastly, 61 patients who had an incomplete follow-up for 3 years were removed to predict the 3-year recurrence or death. Finally, data for the 185 patients was used as training data and test data. In this study, the time to recurrence was defined as an interval from surgery to the first evidence of disease recurrence or last evaluation. The duration of cancer-specific survival was calculated from the date of surgery until the date of cancer-related death or the final follow-up. A description of patient groups is shown in FIG. 9.

All CT images were obtained with intravenous iodine contrast media using various scanners and convolution kernels. A CT protocol was as follows: 100 kVp to 130 kVp, 72 mAs to 679 mAs, 0.70 mm to 5.00 mm slice thickness, and 0.51 mm to 0.88 mm pixel size.

Prior to deriving biomarkers, in this study, the obtained CT images were preprocessed. First, the sizes of voxels were normalized to voxels having a size of 1 mm through cubic interpolation. Empirical semantic analysis of tumor size became possible through the voxel size normalization.

Next, a reconstruction kernel normalization process was performed. The reconstruction kernel normalization process corresponds to a task of unifying the texture of the tumor shown in the image. For example, it is assumed that patient A has a tumor having a coarse texture and patient B has a tumor having a fine texture. Since the patients A and B obviously have tumors having different textures, when different reconstruction kernels were used, it may become impossible to distinguish the patients A and B. For example, when raw data obtained by photographing the patient A is generated as a CT image through a reconstruction kernel expressed as a blur and raw data obtained by photographing the patient B is generated as a CT image through a sharply expressed reconstruction kernel, the tumor textures of the patients A and B shown in the images became similar. This is a problem stemming from the fact that the reconstruction kernel used may vary depending on a CT machine or method. Therefore, the reconstruction kernel normalization process as conducted in this study corresponds to a very important task in deriving radiomic features that may be obtained from the images as biomarkers. FIG. 10 is a set of diagrams showing results of comparison of CT images obtained by various CT machines before and after undergoing reconstruction kernel normalization.

In this study, the reconstruction kernel normalization in which the images processed with arbitrary reconstruction kernels were normalized was performed through the following processes. First, a received CT image $L_0$ is passed through Gaussian filters having different scales so that a plurality of filter-passed images $L_k$ were generated. Next, a plurality of frequency images $F_k$ having different frequency components were generated using differences between the plurality of generated filter-passed images $L_k$. Then, the above processes were repeated until a standard deviation of the plurality of frequency images $F_k$ is less than or equal to a standard deviation of a reference image to be normalized and a preset value.

FIGS. 11 and 12 are exemplary diagrams for describing a procedure of the reconstruction kernel normalization. In the embodiment of FIG. 12, the received CT image $L_0$ is passed through the Gaussian filters so that filter-passed images $L_0$ to $L_6$ may be generated. Since a filter that has an increased Gaussian filter scale σ from a filter-passed image $L_1$ toward a filter-passed image $L_6$ is applied, the image became gradually blurry. Since a frequency image $F_k$ is obtained by subtracting a more blurred image from a less blurred image, the frequency image $F_k$ is an image in which an edge corresponding to a difference therebetween is left.

Next, in order to examine only a target lung segmented region, an operation of multiplying the generated frequency image $F_k$ by a lung segmented region S is performed. Accordingly, all values of remaining regions other than the lung segmented region S may be made zero. For reference, vectorization means converting a 3D matrix into a one-dimensional (1D) vector.

Next, a difference λ from a reference kernel r was calculated by calculating a standard deviation of only the lung segmented region. In FIG. 11, an output image may be obtained through the following equations for calculating the difference value. The content described in the last three lines of FIG. 11 means that a process is repeated until the difference value is less than or equal to a preset value. In the embodiment of FIG. 11, the process is repeated unless the difference value is greater than or equal to and less than 1.05.

In this study, the radiomic features derived from the CT images subjected to the voxel size normalization and the reconstruction kernel normalization were defined as $f_{norm}$ and the radiomic features derived from the CT images without performing normalization were defined as $f_{unnorm}$. This is to check whether the normalization process has an effect on improving prognosis prediction performance.

In order to segment the tumor, a radiologist assigned the location of the tumor on the CT image and then an engineer used a semi-automatic segmentation method. Unlike the method described in this study, a method of automatically segmenting a tumor using software may be used.

Using the segmented regions, in this study, a total of 851 radiomic features were extracted. As described above, there is a problem in that the segmented tumor region depends on what software tool is used or on the proficiency of the radiologist. When the value of radiomic feature is highly dependent on how or who segmented the tumor region, it means that the radiomic feature is not suitable as a prognostic factor. Accordingly, in this study, the radiomic features which do not vary significantly (i.e., stable) were selected according to how the tumor region was segmented by the stability test.

In this study, the stability test was performed on a set of 33 patients. The segmentation was performed twice on each of the 33 cases and then the radiomic features were derived from each segmentation result. Since different segmented regions were obtained due to error levels even in the same case, the values of the radiomic features calculated in the corresponding regions also varied. The stability test was conducted to select the radiomic features of which the values were not changed significantly even when such a difference occurs, and a criterion required that a symmetric mean absolute percentage error (SMAPE) be less than 2.5%. All of the radiomic features except for 78 radiomic features out of 851 radiomic features had SMAPEs of 2.5% or higher, and thus the radiomic features did not pass the stability test. SMAPEs of the first to third biomarkers f1, f2, and f3 used in this study were 0.7%, 1.6%, and 0.7%, respectively. That is, even when there is a difference in derivation of the segmented regions, which inevitably occurs due to differences in expert standards, algorithms, and software performance, the first to third biomarkers f1, f2, and f3 were verified as highly stable and highly reproducible biomarkers with a difference in values of radiomic features extracted from the corresponding segmented region at a level of 0.7 to 1.6%.

A study was conducted to find radiomic features related to prognosis for the 78 radiomic features that had passed the stability test. Since it is known that the prognosis prediction model trained using features selected by Wilcoxon rank sum test shows the best performance in predicting 2-year survival of non-small cell lung cancer (NSCLC) patients, the Wilcoxon rank-sum test was used to select the radiomic features related to prognosis even in this study. FIG. 13 is a reference diagram showing stability test and a Wilcoxon rank-sum test process.

Since a combination of clinicopathological features, Tumor-Node-Metastasis (TNM) stage, and radiomic features is more effective in predicting disease-free survival in early-stage NSCLC patients, the clinicopathological features were added when generating the prognosis prediction model even in this study. However, since the TNM stage was analyzed to be correlated with most radiomic features, data of patients with the same TNM stage was used when generating the prognosis prediction model. This is because the performance of the prognosis prediction model may deteriorate due to overfitting when the radiomic features were used with the TNM stage. Accordingly, in this study, the Wilcoxon rank-sum test of the radiomic features was performed using data of 77 patients with TNM stage 1.

In this study, a random forest (RF) algorithm was used to generate a 3-year RFS prediction model with the clinicopathological features and the selected radiomic features. The clinicopathological features used for the model training were TNM stage, age, and sex, which showed the highest 5-fold cross-validation AUC for all combinations of 5 clinicopathological features (TNM stage, age, sex, pack years, and histology). In order to prevent overfitting when generating the model, the patients with TNM stages 2A and 2B were used as TNM stage 2 and the training data was augmented by a factor of 10.

In this study, the number of patients was small because patients with TNM stage 1 were used for a prognostic relevance test. Further, through the stability test and redundancy test, the radiomic features were selected more strictly. As a result, when selecting the feature that satisfies p<0.05 in the prognostic relevance test, there was a problem in that only one feature was selected for $f_{norm}$. Accordingly, in this study, a statistical significance criterion was lowered to p<0.10 for the prognostic relevance test to select more radiomic features for the prognosis prediction model generation.

As described above, among the 851 radiomic features, 78 radiomic features satisfied the stability test. Among those 78 features, four features satisfied the prognostic relevance test for both $f_{unnorm}$ and $f_{norm}$. After performing the redundancy test, one and three radiomic features were ultimately selected for $f_{unnorm}$ and $f_{norm}$, respectively. The radiomic feature commonly selected from $f_{unnorm}$ and $f_{norm}$ was the third biomarker f3 in this study, and the remaining two radiomic features selected from only $f_{norm}$ were the first and second biomarkers f1 and f2 in this study. The first to third biomarkers f1, f2, and f3 may also be expressed as Original-FirstOrder-90Percentile ($f_{90p}$), Original-GLSZM-SmallAreaEmphasis ($f_{SAE}$), and, waveletHLL-GLCM-InverseDifferenceNormalized ($f_{IDN}$), respectively.

In this study, it was statistically shown that the patients with 3-year RFS and the patients with 3-year recurrence or death had been better classified after the CT image normalization. For a training and test set (n=185), a p-value of the third biomarker f3 ($f_{IDN}$) was lowered from 0.000116 to 0.000003 after the normalization. Likewise, a p-value of the first biomarker f1 ($f_{90p}$) was also lowered from 0.003 to 0.001 or less after the normalization, and a p-value of the second biomarker f2 ($f_{SAE}$) was lowered from 0.012 to 0.001 after the normalization. FIG. 14 is a diagram showing such values in a table, which are summarized.

In this study, an RF model trained with three clinicopathological features was defined as $RF_{clinic}$. A test AUC, a standard deviation, and a p-value of the $RF_{clinic}$ were 0.690, and 0.029 (compared to $RF_{norm}$), respectively.

In this study, the importance of the CT image normalization was analyzed from two aspects. First, the RF models trained by the radiomic features and the three clinicopathological features selected from the $f_{unnorm}$ and $f_{norm}$ were defined as $RF_{unnorm1}$ and $RF_{norm}$, respectively. A test AUC, a 1 standard deviation range, and p-values of $RF_{unnorm1}$ and $RF_{norm}$ were (0.702, 0.639-0.765, and 0.010 (compared to $RF_{norm}$)) and (0.802, 0.752-0.809, and reference), respectively. This means that the performance of the prognosis prediction model can be improved by using more radiomic features selected after the normalization.

Second, the RF model trained with the first to third biomarkers f1, f2, and f3 and the three clinicopathological features in $f_{unnorm}$ was defined as $RF_{unnorm2}$. A test AUC, a 1 standard deviation range, and a p-value of the $RF_{unnorm2}$ were 0.767, 0.714-0.820, and 0.208 (compared to $RF_{norm}$), and the test AUC was lower than the AUC of $RF_{norm}$. This result implies that, even when the same radiomic features are used in the prognosis prediction model, the radiomic features thereof are more effective in predicting the prognosis after the normalization of the CT image.

In addition, in this study, it was found that the prognosis prediction performance was superior to that for the patients (51 patients) with adenocarcinoma. The test AUC, the 1 standard deviation range, and the p-values of $RF_{clinic}$, $RF_{unnorm1}$, $RF_{unnorm2}$, and $RF_{norm}$ for the patients with adenocarcinoma were (0.7230, 0.640-0.806, and 0.038 (compared to $RF_{norm}$)), (0.7201, 0.632-0.808, and 0.008 (compared to $RF_{norm}$)), (0.8340, 0.776-0.892, and 0.176 (compared to $RF_{norm}$)), and (0.8803, 0.829-0.931, and reference), respectively.

In this study, the test set was stratified into low-risk and high-risk groups. A threshold for stratification was a median value of the training data prediction scores of the RF model. As a result of Kaplan-Meier analysis for the stratified two groups, hazard ratios (HRs) (95% CI, p-value) of the $RF_{clinic}$, $RF_{unnorm1}$, $RF_{unnorm2}$, and $RF_{norm}$ were 2.638 (1.271-5.474, 0.007), 3.471 (1.635-7.369, 0.001), 2.926 (1.381-6.208, 0.003), and 5.950 (2.264-15.635, 0.001 or less), respectively. Although all of the models were statistically significant in stratifying the low-risk and high-risk groups, it can be shown that the results became more accurate after the CT image normalization.

Further, in this study, through subgroup analysis, it was found that the HRs which stratified the patients into low-risk and high-risk groups were superior to those for patients with adenocarcinoma (51 patients). The HRs (95% CI, p-value) for the patients with adenocarcinoma of $RF_{clinic}$, $RF_{unnorm1}$, $RF_{unnorm2}$, and $RF_{norm}$ were 3.290 (1.101-9.831, 0.024), 2.749 (0.920-8.210, 0.059), 4.100 (1.419-11.845, 0.005), and 10.296 (2.296-46.174, 0.001 or less), respectively.

Table 3 below summarizes the above-described results. In Table 3, p-value 1 shows comparison with the reference and p-value 2 shows comparison between the low-risk group and the high-risk group classified by the corresponding model.

TABLE 3

| | Test set (n = 79) | | | |
|---|---|---|---|---|
| Model | AUC (± standard deviation) | p-value 1 | Hazard Ratio (HR, 95% CI) | p-value 2 |
| $RF_{clinic}$ | 0.690 (0.626-0.754) | 0.029 | 2.638 (1.271-5.474) | 0.007 |
| $RF_{unnorm1}$ | 0.702 (0.639-0.765) | 0.010 | 3.471 (1.635-7.369) | 0.001 |
| $RF_{unnorm2}$ | 0.767 (0.714-0.820) | 0.208 | 2.926 (1.381-6.208) | 0.003 |
| $RF_{norm}$ | 0.802 (0.752-0.853) | Reference | 5.950 (2.264-15.635) | <0.001 |
| | Test set with Adenocarcinoma (n = 51) | | | |
| Model | AUC (± standard deviation) | p-value 1 | Hazard Ratio (HR, 95% CI) | p-value 2 |
| $RF_{clinic}$ | 0.723 (0.640-0.806) | 0.038 | 3.290 (1.101-9.831) | 0.024 |
| $RF_{unnorm1}$ | 0.720 (0.632-0.808) | 0.008 | 2.749 (0.920-8.210) | 0.059 |

TABLE 3-continued

| | | | | |
|---|---|---|---|---|
| $RF_{unnorm2}$ | 0.834 (0.776-0.892) | 0.176 | 4.100 (1.419-.1.845) | 0.005 |
| $RF_{norm}$ | 0.880 (0.829-0.931) | Reference | 10.296 (2.296-46.175) | <0.001 |

FIGS. 15 to 17 are diagrams showing results of comparison of CT images in the cases in which the values of the first to third biomarkers f1, f2, and f3, which were derived in the present invention and study, are high and low. Each figure shows a case where a value of one biomarker is different and values of the remaining two biomarkers are similar. Accordingly, it can be seen that the first to third biomarkers derived in the present invention are biomarkers that may detect the type and texture of the tumor, and it can be confirmed that these features are effective in predicting the prognosis.

Meanwhile, terms "unit" or "module" used in the present invention may include a unit composed of hardware, software, or firmware and, for example, may be used interchangeably with a term such as logic, a logic block, a component, or a circuit. The unit or the module may be an integrally constituted part or a minimum unit or a part thereof that performs one or more functions. For example, the module may be configured as an application-specific integrated circuit (ASIC).

Various embodiments of the present invention may be implemented as software including instructions stored in a machine-readable storage medium (e.g., a computer-readable storage medium). The machine may include a device capable of calling the stored instruction from the storage medium and operating according to the called instruction and may include an electronic device (e.g., the electronic device 100) according to the disclosed embodiments. When the instruction is executed by a processor, the processor may perform a function corresponding to the instruction using other components under the control of the processor. The instruction may include code generated or executed by a compiler or interpreter. The machine-readable storage medium may be provided in the form of a non-transitory storage medium. Here, the "non-transitory" means that the storage medium does not include a signal and is tangible, and does not distinguish that data is semi-permanently or temporarily stored in the storage medium.

According to an embodiment, the methods according to various embodiments disclosed in this specification may be provided by being included in computer program products. The computer program products may be traded between sellers and buyers as commodities. The computer program products may be distributed in the form of a machine-readable storage medium (e.g., compact disc read only memory (CD-ROM)) or online through an application store (e.g., Play Store제). In the case of online distribution, at least some of the computer program products may be temporarily stored or temporarily generated in a storage medium such as a memory of a server of a manufacturer, a server of an application store, or a relay server.

Each of the components (e.g., the module or the program) according to various embodiments may be composed of a singular or a plurality of entities, and some sub-components among the above-described sub-components may be omitted, or other sub-components may be further included in various embodiments. Alternatively or additionally, some components (e.g., the module or the program) may be integrated into a single entity to perform the same or similar functions performed by each corresponding component prior to the integration. According to various embodiments, the operations performed by the module, the program, or other component may be sequentially, parallelly, repetitively, or heuristically performed, or at least some operations may be performed in a different order, may be omitted, or other operations may be added.

REFERENCE NUMERALS

100: Electronic Device
110: Input Unit
120: Communication Unit
130: Memory
140: Output Unit
150: Processor

What is claimed is:

1. A method of predicting a prognosis of a patient with adenocarcinoma using image features, the method comprising:
receiving an image including a lesion region of a patient;
preprocessing the received image;
segmenting the lesion region in the preprocessed image and calculating at least one of biomarkers indicating an intensity value and a texture information value within the segmented lesion region; and
outputting a prognosis prediction value of the patient on the basis of the calculated at least one biomarker,
wherein the at least one biomarker has a symmetric mean absolute percentage error (SMAPE) value of less than 2.5% according to a difference in a method of segmenting the lesion region.

2. The method of claim 1, wherein the calculating of the at least one of the biomarkers includes measuring intensities of all voxels within the segmented lesion region and calculating a value of a component corresponding to the top 10% when sorting values of the measured intensities of all the voxels in descending order as a first biomarker.

3. The method of claim 2, wherein the first biomarker is a radiomic feature by which a type of lung nodule is determined.

4. The method of claim 2, wherein the first biomarker is a radiomic feature quantitatively indicating a consolidation/tumor ratio.

5. The method of claim 1, wherein the calculating of the at least one of the biomarkers includes converting the segmented lesion region into a preset matrix, calculating a second biomarker having the value corresponding to a texture of the lesion region using the converted matrix, and calculating a third biomarker having the value corresponding to the texture of the lesion region using the converted matrix.

6. The method of claim 5, wherein the calculating of the second biomarker includes converting the segmented lesion region into a matrix in which a distribution of a small-size zone is measured.

7. The method of claim 5, wherein the calculating of the third biomarker includes converting the segmented lesion region into a matrix in which local homogeneity is measured.

8. The method of claim 1, wherein the preprocessing of the received image includes performing preprocessing for normalizing the image processed with an arbitrary reconstruction kernel.

9. The method of claim 8, wherein the performing of the preprocessing for normalizing the image includes generating a plurality of filter-passed images by passing the received image through Gaussian filters having different scales, generating a plurality of frequency images having different frequency components using differences between the plurality of generated filter-passed images, and repeating the generating operations such that a standard deviation of the plurality of generated frequency images is less than or equal to a preset value.

10. The method of claim 1, further comprising generating a prognosis prediction model on the basis of the calculated at least one biomarker,
    wherein the outputting of the prognosis prediction value of the patient includes outputting the prognostic predictive value derived by inputting the image including the lesion region of the patient to the generated prognosis prediction model.

\* \* \* \* \*